June 30, 1959 L. W. MECKLENBORG 2,892,921
METHOD OF AND APPARATUS FOR EDGE WELDING SHEET MATERIAL
Filed Jan. 28, 1957 7 Sheets-Sheet 1

INVENTOR.
Lawrence W. Mecklenborg
BY Gerold B. Fjoflot
His attorney

Fig. 8

June 30, 1959 L. W. MECKLENBORG 2,892,921
METHOD OF AND APPARATUS FOR EDGE WELDING SHEET MATERIAL
Filed Jan. 28, 1957 7 Sheets-Sheet 3

INVENTOR.
Laurence W. Mecklenborg
BY Gerald B. Tjoflat
His Attorney

June 30, 1959   L. W. MECKLENBORG   2,892,921
METHOD OF AND APPARATUS FOR EDGE WELDING SHEET MATERIAL
Filed Jan. 28, 1957   7 Sheets-Sheet 4

Fig. 12

| | | Formweld | Angleweld |
|---|---|---|---|
| r | t | Fill area (Sq. in) | Fill area (Sq. in) |
| 0.070" | 0.036" | 0.0021 | 0.00026 |
| 0.125" | 0.036" | 0.0067 | 0.00030 |
| 0.100" | 0.072" | 0.0043 | 0.00093 |
| 0.150" | 0.072" | 0.0097 | 0.00102 |

Fig. 17

INVENTOR.
Lawrence W. Mecklenborg
BY Gerald B. Tjoflat
His Attorney

Fig. 13 r = outside radius of bend
t = sheet thickness
β = angle between horizontal & weld axis r = outside radius of bend
l = length of weld on cross section
l = √2rt

$G_{100}$ = Gap at 100% set down in inches
$$G_{100} = 2\left[(t-r) + \sqrt{rt - \frac{t^2}{4}}\right]$$

$G_0$ = Gap at 0% set down in inches
$$G_0 = 2\left[(t-r) + \sqrt{rt - \frac{t^2}{4}}\right]$$

United States Patent Office 2,892,921
Patented June 30, 1959

2,892,921

METHOD OF AND APPARATUS FOR EDGE WELDING SHEET MATERIAL

Lawrence W. Mecklenborg, Cincinnati, Ohio, assignor to Precision Welder & Machine Company, Cincinnati, Ohio, a corporation of Ohio Application January 28, 1957, Serial No. 636,655

15 Claims. (Cl. 219—81)

This invention relates to the welding of metal sheets or strips at adjacent edges thereof to provide a composite sheet or strip which is wider than either of the sheets or strips, the sheets or strips being joined by a solid, continuous homogeneous weld.

The invention of this application is an improvement upon the invention of the copending application of Karl W. Matthes Serial No. 420,856 filed April 5, 1954, now Patent No. 2,784,299 and which is owned by the assignee of this application.

Figure 12:
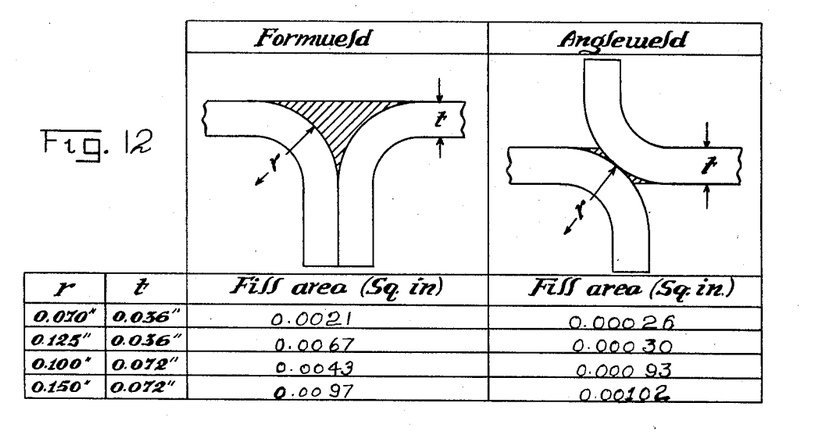
Fig. 12 is a view showing the difference between a form weld and the angle weld which is performed by the apparatus of this application and in accordance with the method thereof, the view including data by which the form weld and the angle weld fill area requirements may be compared.

The invention of the Matthes application supra, provides for the edge welding of sheets or strips by what is called a "Form weld." The invention of this application provides for the edge welding of similar material and formed sheet metal products as well, by an "Angle weld." The difference between the "Form weld" and the "Angle weld" is shown in Figure 12 of the drawings. As shown in Fig. 12, the fill area of the "Form weld" is much larger than is the case with the "Angle weld." For that reason the volume of weld metal required in the "Form weld" is much greater than in the case of the "Angle weld." The "Angle weld" is particularly suitable to light guage sheets or strips and products made from the same, although the two types of weld may be employed in the same range of gauges.

The terms "Sheets" and "Strips" as employed in this application may be used interchangeably: "Strip" as used in the industry usually has reference to flat material produced on so-called continuous strip mills and supplied to the trade in large coils. "Sheets" refer to flat stock which is sold in the flat form as distinguished from the coiled. When strips are cut into lengths of varying dimensions, the latter may be called a sheet. For convenience and, so far as is necessary to an understanding of the invention, the terms "Sheet" and "Strip" have reference to flat material whether in the coil or the flat form.

Fabricated products of sheet metal may also be joined by the angle weld method and apparatus of the invention. An example of such a case is where single sheet metal sinks are joined at adjacent edges by an angle weld to form a double sink. Other sheet metal objects of course may be similarly united.

The invention relates more particularly to a method and apparatus for welding metal sheets at their edges by the employment of an angle weld. In the formation of the weld, the sheets may be held stationary relative to the apparatus by which the weld is effected or the apparatus may be held stationary with reference to the sheets.

Present day rolling mills are capable of rolling continuous wide strips. These strips vary in width depending upon the size of the mill. Common widths of strips as produced by such mills are 36, 48, and 96 inches. The mills which roll the widest strips are quite expensive compared to the mills that roll the narrower strips and, furthermore, the widest strip commands a premium price.

In many industries among which is included the automobile body industry, steel sheets are required which are wider than the customary narrow sheets, and may even be wider than the widest sheets now rolled. Therefore, in order to obtain a sufficiently wide sheet for body purposes, two sheets of equal or different widths have been welded together at their edges to provide a sheet having the requisite over-all width. The welding procedures heretofore used have been expensive, time consuming, and did not always provide a sound weld.

In industries other than the automobile industry, there are well-defined needs or demands for methods and apparatus for welding metal sheets at their edges in such fashion that the weld is sound and not noticeable to the eye after the weld has been completed and the surfaces of the sheets at the weld line have been finished.

To weld sheets at their edges is a difficult operation. First of all, it is extremely difficut to provide edges that are perfectly straight and free of burrs, or imperfections, unless expensive machinery and extreme care is taken to condition the edges. Furthermore, it is extremely difficult to butt-weld the edges of sheets because of their relative thinness and the difficulty of holding the edges in such perfect contact that a weld can be effected by the so-called flash method. It is also difficult to effect the equivalent of a butt-weld by using weld wire or rod to edge-weld the sheets.

In accordance with this invention, a method is provided whereby sheets may be welded at their edges while held in a stationary condition or sheets may be welded continuously as they are uncoiled from coils.

In accordance with the method, the adjacent edges of the metal sheets to be welded are flanged in opposite directions, preferably with a right-angled flange, so that the outside corners of the respective flanges are straight and parallel with one another when brought into engagement. The sheets thus flanged are placed in juxtaposition so that the outside corners of the flanges are in abutment to a greater or lesser degree according to the type of weld and the material to be welded. Opposed coplanar forces are then applied as close to the inside corners of the flanges as may be practical and to the flanges themselves. The magnitude of these forces should be such that the corners are squeezed firmly into engagement. The welding current is applied to the sheets at locations adjacent the outside edges of the flanges. The means for supplying the current exerts sufficient pressure to maintain the flanges in their proper location with respect to the squeeze producing means.

By moving the sheets relative to the point of localized pressure, the point of such pressure travels along the outside corners of the flanges during the welding operation. The electric potential applied to the sheets causes electric current to flow from the electrode through the engaging outside corners of the angles to the other electrode. This current is of such intensity that the metal is heated to fusion to form a sound weld.

Also in accordance with the invention, "Gap" and "Set down" may be adjusted in accordance with the thickness of the metal to be welded and the outside radius of the bend at the flanges of the sheets. The terms "Gap" and "Set down" will be defined more specifically in connection with the description of Figures 13 to 16, both inclusive.

When a pair of sheets have been welded at the edges by the "Angle weld" procedure, the flanges and excess metal may be removed by means known in the art.

In forming the flanges, it is preferred that the radii of the outside corners thereof shall have a value that bears a predetermined relationship to the thickness of the metal so that the fill area at the weld may be adjusted to suit the requirements of the particular gauge of the material being welded.

An object of this invention is to provide a method whereby sheets may be edge-welded by resistance welding, as above set forth, thereby avoiding the difficulties of flash welding.

Another object of the invention is to so prepare the edges of adjacent sheets that those edges may be held at the weld line in a positive, firm relationship whereby when the welding current is applied there is substantially no arcing or sputtering.

Another object of the invention is to provide apparatus whereby sheets having oppositely extending flanges may be so guided and manipulated that they may be joined by a weld at the corners of the flanges by squeezing the outside corners of the flanges together at a localized point and moving that point relative to the flanges, while at the same time supplying welding current to such point, whereby a homogeneous, solid weld may be formed from one end of the flanges of the sheets to the other and whereby the area to be filled by weld metal is reduced to a minimum.

Another object of the invention is to provide apparatus whereby coiled sheets may be uncoiled and fed to a welding apparatus and, while the sheets are passing to the same, the adjacent edges of the sheets are continuously flanged in opposite directions; and to provide the welding apparatus with means for receiving the flanged edges of the sheets, applying opposed forces to the inside corners of the flanges at a localized point so that the outside corners of the flanges are engaged with adequate pressure to cause the weld metal to fill the gap between those rounded corners and thereby form a sound weld with a minimum requirement of weld metal.

The foregoing and other objects and advantages of the invention will be apparent to those of ordinary skill in the art to which the invention pertains, from the following description taken in conjunction with the accompanying drawings.

Figure 1:
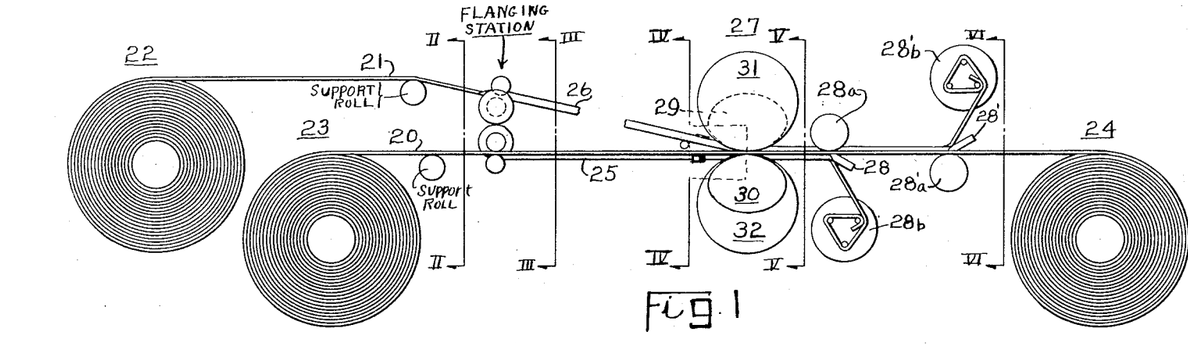
Figure 1 is a more or less schematic view in side elevation of apparatus arranged and constructed in accordance with an embodiment of this invention whereby sheets may be continuously flanged and welded as they are uncoiled from the coils of sheet material.
Figure 2:
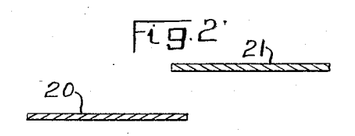
Fig. 2 is a view in section taken on line II—II of Fig. 1.
Figure 3:
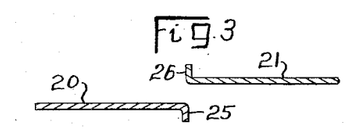
Fig. 3 is a view in section taken on line III—III of Fig. 1.

The method of the invention may be practiced for continuously welding flanged edges of sheets 20 and 21 as they are uncoiled from coils 22 and 23, respectively, of Fig. 1. The welding may be accomplished by means of the apparatus shown in Figs. 1, 8, 9, 10, 11 and 17 and Fig. 18. The method may also be practiced in the welding of smaller sheets or fabricated sheet metal products, at their edges by holding the flanged edges thereof stationary and progressively welding the flanged edges from end to end. In the case of continuous welding of sheets as they uncoil from coils, such as 22 and 23, the flanges may be formed as the material is drawn through the welding apparatus and coiled on a recoiler 24. The method and apparatus may also be employed for welding together fabricated sheet metal objects.

As the sheet material is uncoiled from the coils 22 and 23, the adjacent edges of the sheets are formed with flanges 25 and 26 that extend in opposite directions. For example, the flange 25 of sheet 20 may extend downwardly while the flange 26 of sheet 21 may extend upwardly.

Figure 4:
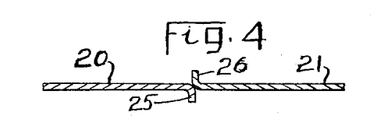
Fig. 4 is a view in section of the sheets taken on line IV—IV of Fig. 1 showing the outside corners of the flanges of the two sheets in engagement.
Figure 5:
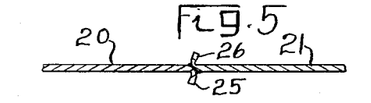
Fig. 5 is a view corresponding to Figure 4 showing the sheets after they have been welded.
Figure 6:
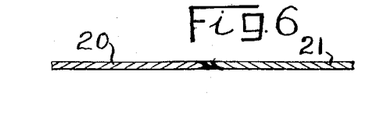
Fig. 6 is a view of the weld after the flanges and flash have been trimmed and removed from the weld line.
Figure 7:
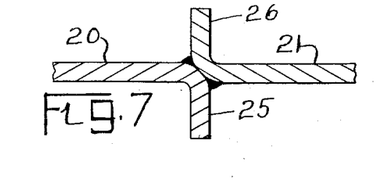
Fig. 7 is an enlarged view of the section in Fig. 5.

As the flanged edges pass through the welding station 27, the adjacent outside rounded corners of the flanges are kept separated as long as possible before they are brought into contact, as shown in Fig. 4. The contact is made just prior to entry into the throat of the welder. This is to ensure that the weld current will flow principally at the place where it is intended to flow, namely, at the crotch of the V formed by the flanges in the throat or bite of the welding station. The throat or bite of the welder is located at the place of greatest constriction, that is the space circumscribed by the roller electrodes and squeeze rolls, or as defined between the roller electrodes and the guides therefor of the embodiment shown in Fig. 18. After the sheets pass through the welding station, the flanges 25 and 26 and the excess metal at the weld line are removed by trimming means 28 and 28' which are backed by rollers 28a and 28'a. The material thus removed may be wound on reels 28b and 28'b.

The welding station 27 comprises opposed squeeze rolls 29 and 30 and roller electrodes 31 and 32. The squeeze rolls 29 and 30 engage the inside corners of the flanges 26 and 25, respectively. The roller electrode 31 is so positioned that the flange 26 is disposed between a wear plate 67 of the roller electrode and a face 33 of the squeeze roll 29. The squeeze roll 29 has an angled rim as shown which includes the face 33 and a face 34. These faces form an angle of approximately 90° so that the face 34 rolls on the sheet which, as shown, is in a horizontal position, and the face 33 engages the inside surface of the vertical flange 26. The squeeze roll 30 is similarly constructed and has angularly disposed faces 35 and 36, the angle being such that the sharp point or edge of the rim is received in the inside corner of flange 25. The face 36 as shown, rolls on the underface of the sheet 20. The roller electrode 32 is disposed directly below the squeeze roll 29 and is so positioned with reference to the squeeze roll 30 that the flange 25 passes between a wear plate 74 of the electrode 32 and the face 35 of the squeeze roll.

In practice, the squeeze roll 30 and the electrode 32 may be secured in fixed positions, having first been adjusted with respect to squeeze roll 29 and the electrode 31. The latter may be moved to or from squeeze and welding position once the former have been fixed in location.

The squeeze rolls 29 and 30 are appropriately supported in a frame or housing 38. The mounting apparatus for the squeeze roll 30 is shown in section, while the mounting apparatus of squeeze roll 29 is shown in full. Since they are similar, it is sufficient only to describe the mounting for the squeeze roll 30. Similar and corresponding parts of the mount for squeeze roll 29 will be indicated by the same reference characters with primes affixed.

The mount for squeeze roll 30 comprises a bearing post 40 in which the squeeze roll shaft 41 is journaled. The post 40 is secured to the outer end of a support 42 that is guided in a sleeve 43. The sleeve 43 carries a cylinder 44 that accommodates a piston 45. The piston 45 is provided with a rod 46 that connects the member 40 in any suitable manner. The piston may be actuated by hydraulic fluid pressure admitted to either side of the piston 45, depending upon the direction in which it is intended to move the squeeze roll 30 and the position in which it is to be held when the machine is in operation. The guide 43 is mounted in a support 47 which is a part of the housing 38. It is secured in that housing by means of clamp nuts and bolts 48a and 48b that operate in arcuate slots 48c in the member 47. By such means the angle of the squeeze roll 30 with respect to the vertical may be adjusted in accordance with requirements of a particular welding operation.

The angular slots 48c are shown in full in connection with the mount for squeeze roll 29.

The roller electrode 32 is supported on a shaft or axle 50 carried by a support 51 attached to a slide 52 that operates in a guide 53 in the frame or housing 38. The slide 52 is connected by a piston rod 54 to a piston 55 working in an hydraulic cylinder 56. The cylinder 56 may be supplied with hydraulic fluid through ports 57 and 58 by means of which the roller electrode 32 may be moved to or from its operating position and held in that position. The roller electrode 32 may be insulated from the support 51 by insulation 59. Electric potential may be applied to sleeve 60 by a lead 63.

The mount for the roller electrode 31 is similar to that described for the roller electrode 32; therefore, similar parts have been identified by the same reference characters with primes affixed.

Figures 9, 10, 11:
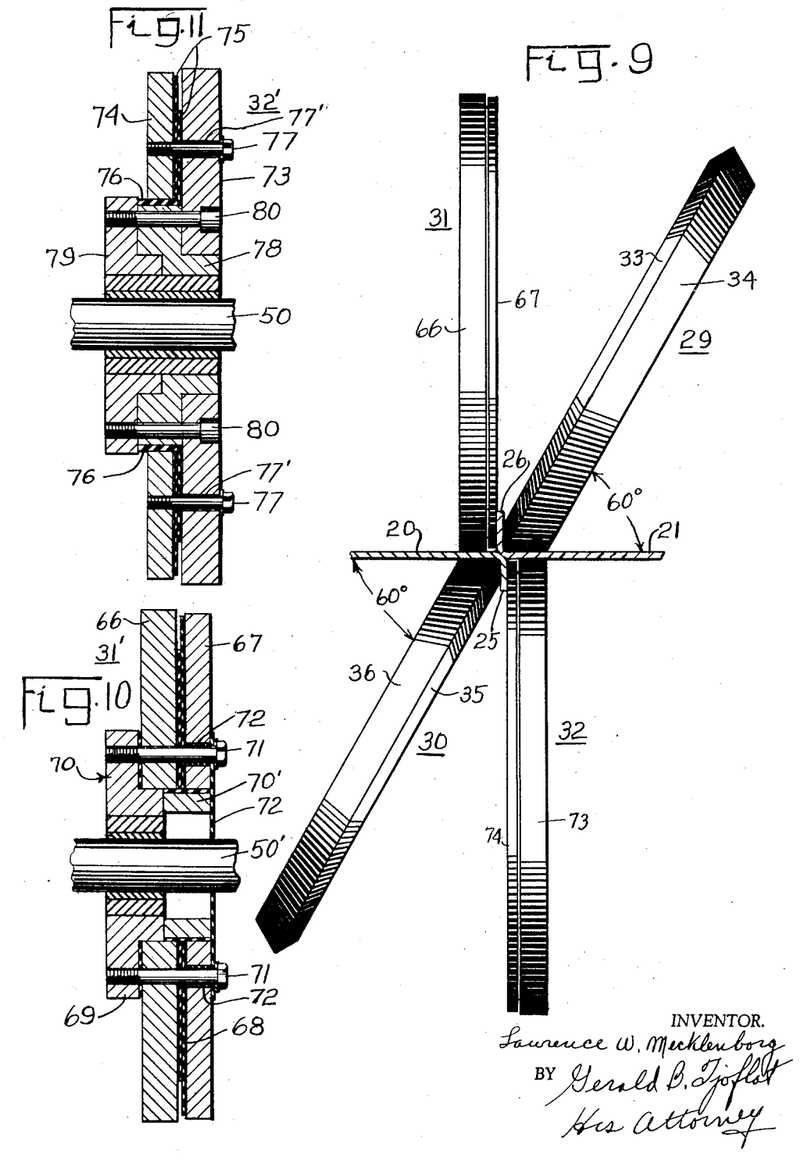
Fig. 9 is a view of the squeeze rolls and the roller electrodes in the preferred position occupied to effect the weld of two sheets in accordance with the invention.
Fig. 10 is a view in section of an upper roller electrode that may be employed in Fig. 9.
Fig. 11 is a view in section of a lower roller electrode that may be employed in Fig. 9.

The roller electrodes 31 and 32 may be constructed as shown in Figs. 10 and 11, respectively, where these electrodes are designated 31' and 32'.

The electrode 31' comprises a wheel 66 and the wear plate or disc 67 of smaller diameter than the wheel and which is spaced from it by one or more layers of insulation 68. The wheel 66 and the disc 67 are bolted to the flange 69 of a hub 70. The wheel 66 and the disc 67 are maintained in concentric relationship by means of a ring 70'. The bolts 71 by which the wheel 66 and the disc 67 are bolted to the hub 70 are insulated from the disc by means of a layer of insulation 72.

Figure 17:
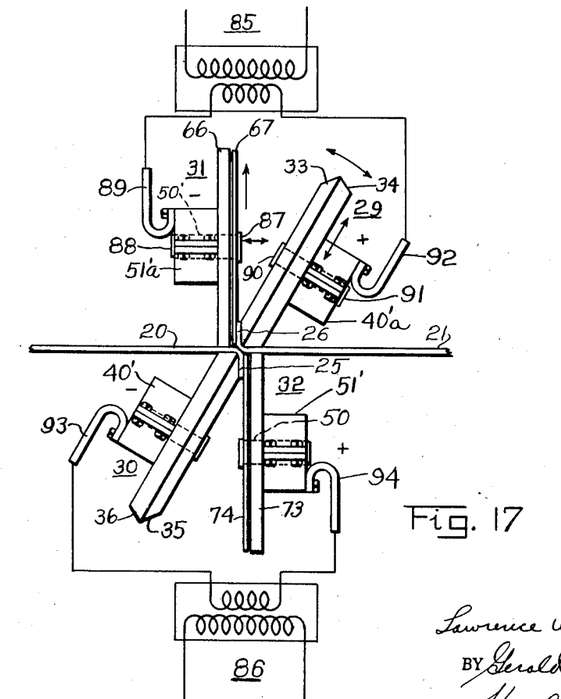
Fig. 17 is a more or less schematic simplification of Fig. 8 showing how electric welding current may be supplied to the work to be welded.
Figure 18:
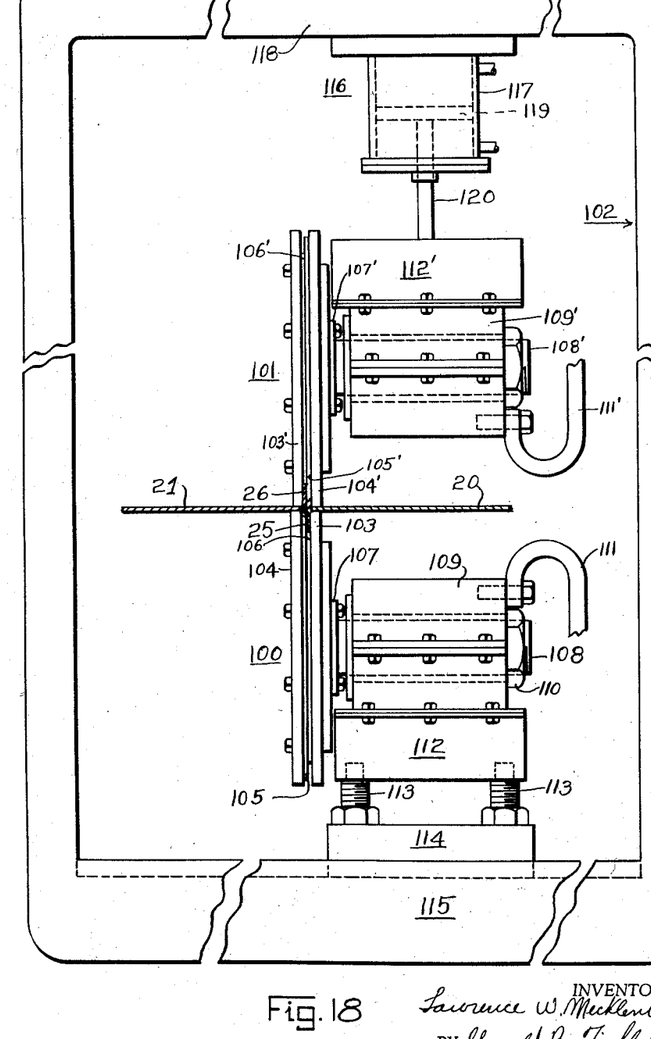
Fig. 18 is a modified form of welding apparatus by means of which the angle weld may be performed in accordance with the method of the invention.

The axle 50' may be journaled in the support or housing 51' and appropriately retained by means of the hub and a retainer nut as shown in Figs. 17 and 18. Fexible welding current supply leads may be bolted to the housing as shown in those views.

The roller electrode 32' is substantially similar to the roller electrode 31'. In fact, it may be identical. However, the form shown in Fig. 11 is slightly different and may be employed in the construction of the roller electrode 31' if so desired. The roller electrode 32' as shown in Fig. 11 comprises a wheel 73 and a disc 74 of lesser diameter which are insulated from each other by means of insulation 75 and 76. The wheel and disc are secured by means of bolts 77, the latter being insulated at 77' from the wheel 73. The wheel 73 and disc 74 are secured to a hub composed of two sections 78 and 79 of the form shown. The wheel 73 is secured to the hub member 79 by means of bolts 80 whereby the inner member 78 is clamped between them.

The guide member 74 is insulated from the shaft or axle 50 by means of the insulation 76. The electric potential may be connected to the shaft 50 through the housing or support in which the shaft is journaled and retained as shown in Figs. 17 and 18.

Figure 8:
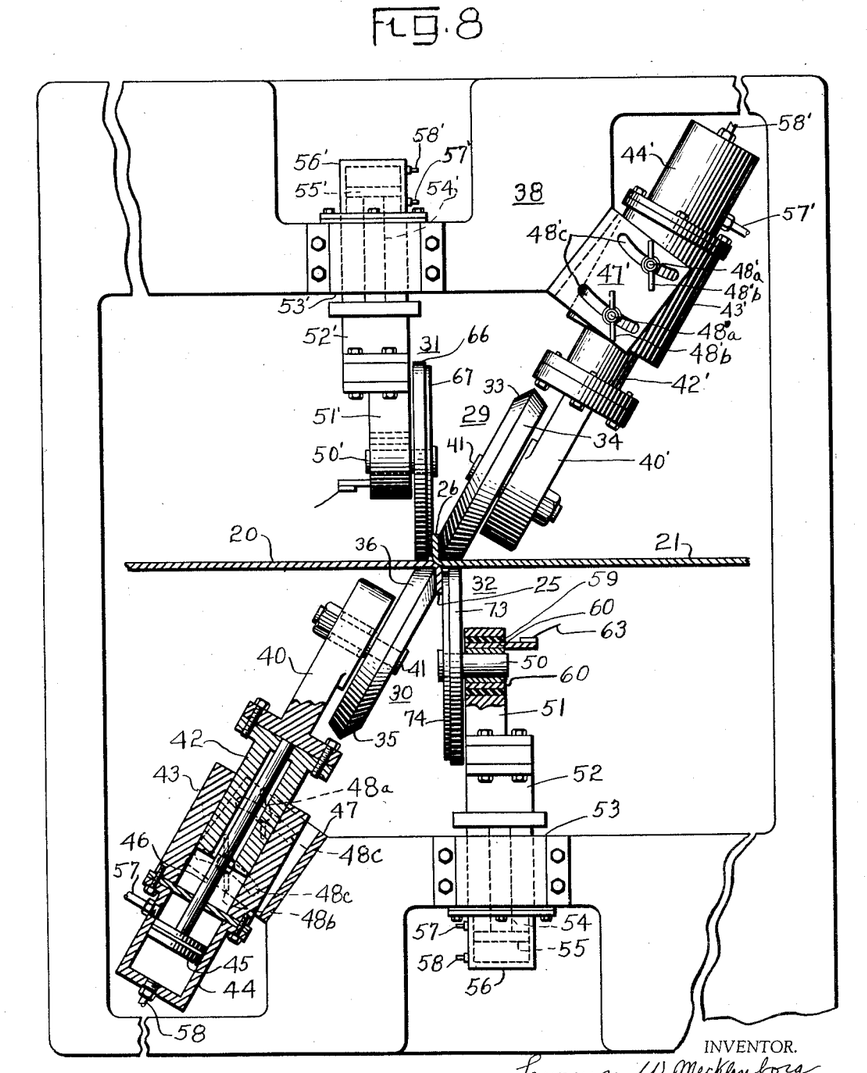
Fig. 8 is a more or less diagrammatic view of the welding apparatus embodied in Fig. 1.

In a preferred form of welding apparatus as shown in Fig. 8, the angle between the squeeze rolls 29 and 30 and their adjacent roller electrodes 31 and 32, is approximately 30°. The weld line between the rounded corners of the flanges of the sheets 20 and 21 is approximately at 90° to the plane containing the sharp edges of the rims of the squeeze rolls. This angle may be varied according to the welding conditions encountered as may be the angle between the squeeze rolls and the roller electrodes.

In practice the lower squeeze roll 30 and electrode 32 may be maintained in a fixed position and the upper squeeze roll 29 and the electrode 31 moved to or from squeeze and welding positions. The squeeze pressure is supplied by the piston 45'. The roller electrode 31 may be actuated into engagement with the sheet 20 as shown in Fig. 8 and Fig. 9 with sufficient pressure to provide a firm positive contact between the sheets and the squeeze rolls and the electrodes.

Fig. 12 and the data there given illustrates the principles of the "Angle weld" of this invention in comparison with the "Form weld." As shown in Fig. 12, the flanges of the sheets in the "Form weld" extend in the same direction and the flanges are in abutment back to back. In the "Angle weld" the flanges extend in opposite directions and they make contact at the outside corners thereof. If it is considered that in the "Form weld" as well as in the "Angle weld" the thickness of the sheets is equal to $t$ and the radius of the outside corners of the flanges is $r$, then it will be apparent that the fill areas (displaced metal DM) in square inches will be considerably less for the "Angle weld" than for the form weld. The values given in Fig. 12 for $r$ and $t$ show that the fill areas increase as the ratio of $r$ to $t$ is changed. Therefore, in the case where $r$ is 0.070 inch and $t$ is 0.036 inch, the fill area in square inches for the "Form weld" is 0.0021, whereas the fill area for the "Angle weld" is 0.00026. In the case where the outside radius $r$ is 0.125" and the thickness is 0.036", the fill area for the form weld is 0.0067 square inch, whereas in the "Angle weld" the fill area is 0.00030 square inch. In the case where the outside radius of the bend is equal to 0.100 inch and the thickness $t$ is equal to 0.072 inch, the fill area for the "Form weld" is 0.0043 square inch, whereas for the "Angle weld" the fill area is 0.00093 square inch. Also in the case where the outside radius of the bend is equal to 0.150 inch, and the thickness is 0.072 inch, the fill area in square inches for the "Form weld" is equal to 0.0097 square inch, whereas in the "Angle weld" the fill area is 0.00102 square inch. The fill areas for the form and the angle welds are indicated by cross hatching. Since the fill areas indicated in Fig. 12 are cross-sections of the weld, it follows that the volume of weld metal per inch or foot length of weld is materially greater in the "Form weld" than in the case of the "Angle weld."

Figure 13:
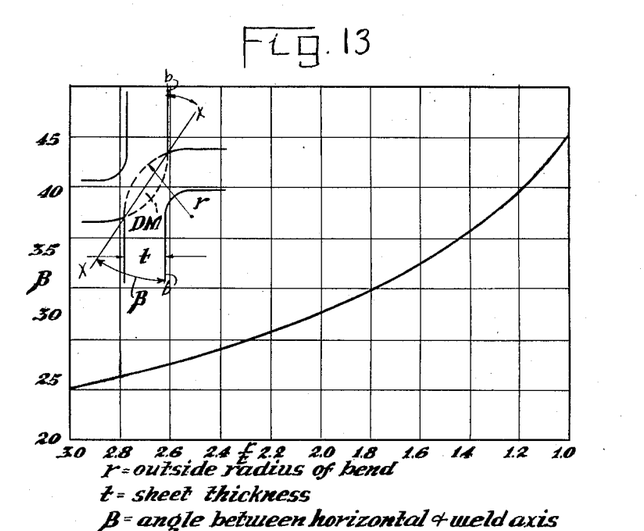
Fig. 13 is a graph showing the relationship between the ratio of the outside radius of the bend of the flanges to the thickness of the metal and the angle of the weld line.

Figure 13 graphically illustrates the weld axis X—X with reference to the plane b—b as a function of the ratio of the outside radius of the bend of the flanges to the thickness of the material. It should be borne in mind that a bend of this nature is not a true circular segment, but is slightly flattened in the middle portion. Therefore, all calculations based on a variable of this sort should be regarded as approximations. In ordinary bending practice where a roller or a press-brake is employed, bends are produced having a ratio of $$\frac{r}{t}$$

varying from about 1.5 to 3.0 with 2.0 being an approximate average. From the graph of Fig. 13 it may be seen that at a ratio of 2 for $$\frac{r}{t}$$

the weld angle is about 30°, while in the ratio range 1.5 to 3.0 a weld angle of 24° to 35° is indicated. Based on this data an angle of 60° from the horizontal appears to be the optimum axis along which the welding force should be applied. The 60° angle minimizes any misalignment of the work due to lack of rigidity in the machine because the resultant forces act normal to the weld axis.

Figure 14:
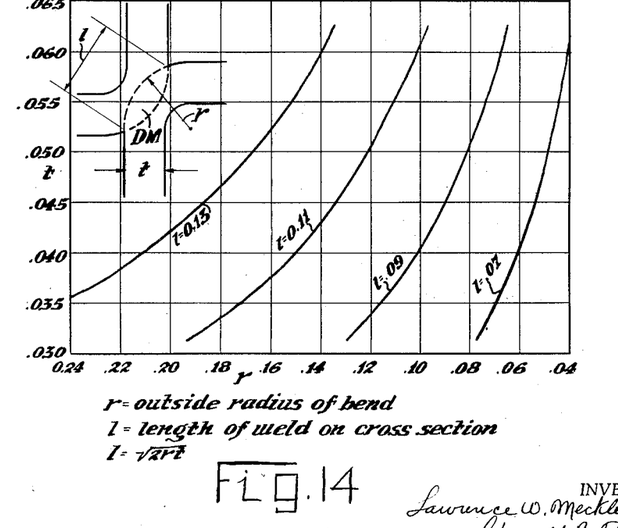
Fig. 14 is a graph showing the relation between the outside radius of the bend of the flanges and the thickness of the material being welded, for various lengths "1" of weld at the weld line.

Fig. 14 is a graph showing the relationship between the thickness $t$ of the sheets and the outside radius $r$ of bend. The length of the weld in cross section is designated by the letter $l$, $l$ is equal to the $\sqrt{2}\ rt$. A given length $l$ can be maintained at various ratios of $$\frac{r}{t}$$

In Fig. 14 four curves are shown for $l=0.13''$, $0.11''$, $0.09''$ and $0.07''$ for thickness values of $t$ ranging from $0.030''$ to above $0.060''$ and an outside radius of bend ranging from $0.24''$ to $0.04''$.

Figure 15:
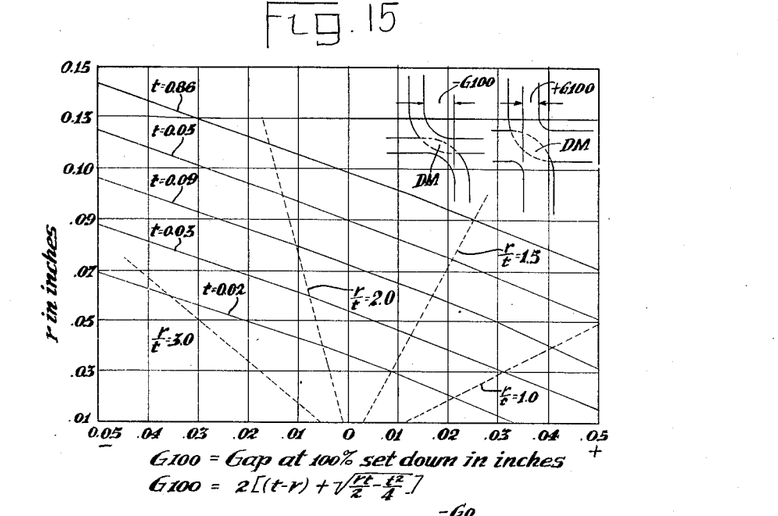
Fig. 15 is a graph showing the relation between the outside radius of the bend of the flanges to gap for various thicknesses of material being welded.
Figure 16:
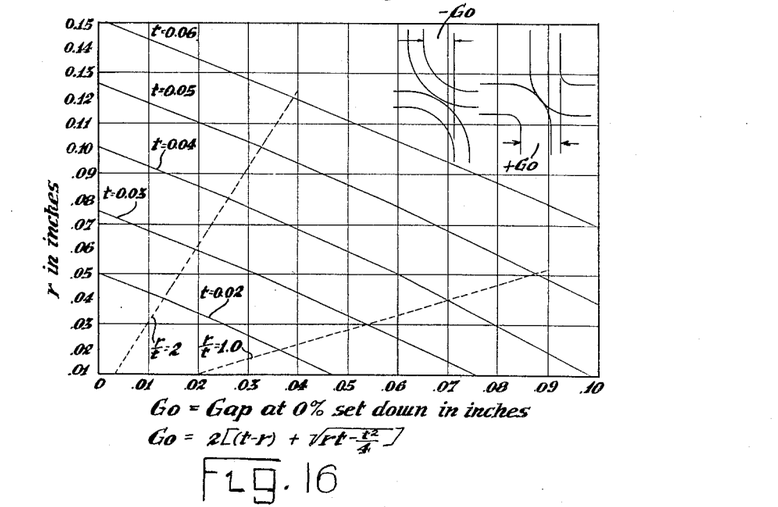
Fig. 16 is a graph showing the relationship between the outside radius of bend and gap at zero percent set down in inches for various thicknesses of material.

Figures 15 and 16 are graphic representations of the relationship between "Gap" to various combinations of $r$ and $t$ where $r$ is the outside radius of the bend and $t$ the thickness of the material. "Gap" is defined as the distance between the vertical flange guide faces of the welding pressure wheels and is positive (plus) when there is a space between these edges, and negative (minus) when the edges overlap. $G_0$ is the gap required to just bring the sheets into line contact while $G_{100}$ is the gap required to cause 100 percent set-down.

"Set-down" is defined as the distance the bottom of sheet 20 or 21 is shown above the bottom of the other, and it is the distance that the one sheet must be displaced by the squeeze rolls in the throat of the welder in order to bring the flat surfaces of the two sheets into alignment at the point of the weld. The "Gap" and the "Set-down" relationship of the flanges and the flat surfaces of the sheets is established forwardly of the welder throat. Thus as a given point on the two flanges come closer and closer to that throat, the more the pressure is exerted on them, so that when the metal becomes plastic, the set-down will have been accomplished.

At 100% set-down more metal is displaced than is theoretically required to occupy the "fill area" shown in Fig. 12. The required gap for the optimum welding conditions lies somewhere between a gap $G_0$ and a $G_{100}$. For example, the optimum gap for 20-gauge metal ($t=0.036$, and $r=0.083$) was found to be at 75% of the distance from $G_0$ to $G_{100}$, or a setting of $-0.017$ inch.

Instead of supplying welding current through the roller electrodes only, it may be supplied through both the electrodes and squeeze rolls as shown in Fig. 17. As there shown, a transformer 85 supplies power to the squeeze roll 29 and the electrode 31 and a transformer 86 supplies power to the squeeze roll 30 and electrode 32. The axle 50' of electrode 31 is journaled in a split bearing housing 51'a. One end of the axle has a flange 87 that abuts the hub of the electrode and the opposite end is threaded to receive a retainer nut 88. The housing 51'a is provided with a laminated flexible lead 89 to which one terminal of the transformer 85 is connected.

The housing 51'a is intended to serve the same function as support 51' of Fig. 8, and it should therefore be understood that it would be connected to and insulated from the actuating mechanism shown in Fig. 8.

The squeeze roll axle 41 may be similarly mounted in a split housing 40'a. One end of the axle may have a flange 90 and the opposite end may be threaded to receive a nut 91 to retain the axle and roll in place on the housing. The housing 40'a is provided with a bolted on flexible laminated lead 92 which is connected to the other terminal of the transformer 85.

The squeeze roll 30 and the electrode 32 are similarly mounted in split housings 40' and 51'. The split housing 40' is provided with a laminated flexible lead 93 and the housing 51' with a similar lead 94 by means of which the squeeze roll and the electrode are connected to the output terminals of the transformer 86.

The output terminals of the transformers 85 and 86 should be so phased that the squeeze roll 29 and electrode 32 are of the same polarity, and the squeeze roll 30 and electrode 31 of the same but opposite polarity, as indicated by the symbols (+) and (−).

In Fig. 18, a modified form of welder is shown. In that modification the electrode assemblies are so constructed and mounted as to serve the three-fold function of (1) guiding the flanged edges of the sheets to the welding throat, (2) supplying the squeeze pressure required, and (3) conducting the welding current to the sheets.

The machine comprises electrode and guide assemblies 100 and 101 which are mounted in a frame 102.

Assembly 100 comprises an electrode wheel 103 and a guide wheel 104 having on its inner face a wear plate or disc 105. The electrode wheel is insulated from the guide wheel by insulation 106. The guide and electrode wheels, the wear plate and the disc of insulation are suitably bolted together, the bolts being insulated so as to electrically isolate the electrode wheel from the guide wheel. The electrode wheel is secured to a flange 107 of an axle 108 that is journaled in a split bearing housing 109. The outer end of the axle may be threaded to accommodate a retainer nut 110. A flexible laminated current input lead 111 is secured to the housing as shown.

The housing 109 is supported on a bed 112 mounted on screw jacks 113. These jacks are mounted in a slide 114 carried by the base member 115 of the frame 102. Thus the bearing housing 109 and the assembly 100 may be moved up or down, or to the right or left so that the machine may be adjusted to suit the requirements of welding a particular piece of work. The insulation between the guide and electrode wheels may be shimmed as required to increase or decrease the space between them according to the "Gap" employed.

The electrode and guide assembly 101 may be similar to the assembly 100 in construction; therefore, corresponding parts are designated by the same characters with primes affixed.

If desired, the assembly 100 may be as shown in Fig. 10, and the assembly 101 as in Fig. 11.

The support 112' is coupled to an actuator 116 whereby the assembly 101 may be actuated to or from welding position. The actuator may comprise a power cylinder 117 mounted on the cross member 118 of frame 102, having therein a piston 119 provided with a piston rod 120 attached to the bed 112'. The power cylinder 117 may be adjusted right or left so that the assembly 101 will be properly positioned with reference to the assembly 100 for any required "Gap" and "Set-down."

As shown in Fig. 18, the flanges 25 and 26 of sheets 21 and 20 are received in the space between the guide and electrode wheels of the assemblies 100 and 101, The pressure for effecting the "Set-down" and the weld is supplied by the power cylinder 117.

From the foregoing it will be seen that the fill area at the welded joint, the weld axis, gap and set-down may be adjusted to suit the requirements of the outside radius r of the bend of the material and the thickness t thereof, by merely adjusting the relative positions of the squeeze rolls and the roller electrodes. These adjustments are clearly indicated by the graphs represented by Figures 12 to 16, both inclusive.

By flanging sheets or strips as herein disclosed thin-gauge material may be edge-welded as well as heavier gauges. Furthermore, the amount of weld metal required in the "angle weld" to fill in the areas at the location of the points of contact of the two sheets while being welded, is less than in the case of the "form weld" where the flanges extend in the same direction and are held in back to back relationship.

Having thus described the invention, it will be apparent to those of ordinary skill in the art to which the invention pertains, that various modifications and changes may be made in the illustrated embodiments without departing from either the spirit or the scope of the invention.

Therefore, what is claimed as new and desired to be secured by Letters Patent is:

1. Apparatus for continuously welding strips of sheet metal at adjacent edges, comprising means for forming oppositely extending substantially right angle flanges along the adjacent longitudinal edges of the sheets, squeeze rolls disposed to engage the inside faces of said flanges adjacent the inside corners thereof to squeeze the corners firmly into engagement, a roller electrode for each sheet for engaging the same at a location adjacent the outside corner thereof, whereby each sheet is firmly held between a roller electrode and a squeeze roll and the flange of each sheet is guided between a roller electrode and a squeeze roll, whereby, when voltage is applied to said electrodes and the squeeze points of said rolls and the pressure points of said electrodes are traveling relative to said sheets, current flows from one electrode through the abutting corners of said flanges to the other electrode, thereby fusing said sheets at said corners and forming a continuous weld.

2. A machine as in claim 1 in which the roller electrodes and the squeeze rolls are so adjustable relative to one another that the gap at the flanges may be adjusted in accordance with the welding requirements of the sheets.

3. A machine as in claim 1 in which the squeeze rolls are substantially coplanar, and the planes containing the roller electrodes are spaced and substantially parallel.

4. A machine as in claim 1 in which the flange of one sheet is located between and engaged by a face of one electrode and one of said squeeze rolls and that the flange of the other sheet is between and engaged by a face of the other electrode and the other squeeze roll.

5. A machine for welding sheets of metal at adjacent edges, said edges having been flanged in opposite directions from the plane of the sheets, said machine having a pair of squeeze rolls disposed in substantially the same plane and at an angle to the plane containing said sheets and adapted to engage the inside corners of said flanges and force the outside corners into engagement, bearings for said squeeze rolls, means for actuating said bearings and rolls whereby the rolls may be actuated into and out of said flange corners, a roller electrode for engaging said sheets at such locations that one of them contacts the sheet on a surface opposite the squeeze roll which is under the same and the other contacts the other sheet at a location where it is opposite and below the other squeeze roll, supporting means for said roller electrodes and means for moving said electrode-supporting means and electrodes into and out of engagement with said sheets.

6. Apparatus for edge welding flat sheets of metal which are provided with flanges along the edges to be joined by a weld, the flanges extending in opposite directions from the plane of the sheets, said machine comprising rotatable squeeze rolls having means for so mounting them that the rolls are in substantially the same plane, the plane being disposed at an angle to the plane of the sheets of approximately 60°, means for yieldingly urging said wheels towards each other to provide squeeze pressure on the inside corners of said flanges, spaced roller electrodes disposed to engage said sheets at locations adjacent the outside corners of the flanges, and means for moving the sheets relative to the squeeze rolls and the roller electrodes, whereby when a voltage of sufficient value is applied to said roller electrodes, the current flow through the engaging corners of the sheet flanges located between the squeeze rolls will heat the metal at said corners to such a condition of fused plasticity as to fill the gap between the corners of the sheets to effectively weld the same.

7. Apparatus according to claim 6 in which the rims of the squeeze rolls have angularly disposed faces which intersect to form a relatively sharp rim, said sharp rim being disposed to engage the inside corners of the flanges at locations above and below the surface of the sheets respectively, and that means are provided for relatively adjusting the squeeze rolls and the roller electrodes whereby the gap at the flanges in the region of pressure by the squeeze rolls may be adjusted according to the thickness of the material and the outside radius of the bends of said flanges.

8. A method of welding sheets edge to edge that comprises forming oppositely extending right-angled flanges along adjacent edges of each sheet, placing said sheets with the flanges in juxtaposition so that the outside corners thereof abut, applying opposed forces to the inside corners of the flanges, applying pressure to the sheets adjacent the outside corners of the flanges and passing electric current through said sheets from the surface adjacent one outside corner to the surface adjacent the other outside corner of the other flange whereby the outside corner areas of the flanges are heated to a fused plasticity and forced into the gap between said corners to form a weld, and then trimming the flanges and excess metal at the point of fusion flush with the opposite faces of the sheets.

9. Apparatus for welding a pair of metal sheets at adjacent edges comprising means for forming oppositely extending right-angled flanges along the edges to be welded, means for supporting said sheets in side-by-side relation with said flanges disposed in opposite directions and the outside corners thereof in engagement, squeeze rolls having relatively sharp rims disposed to operate on the inside corners thereof for squeezing said outside corners together, and a roller electrode for each sheet, one electrode engaging the sheet on its upper surface at a location adjacent the outside corner thereof and the other electrode engaging the underside of the other sheet at a location adjacent its outside corner, said electrodes when voltage is applied thereto causing current to flow from one electrode to the other through the engaging outside corners of the flanges thereby to form plastic weld metal in the gap between the outside corners of the flanges and means for moving the sheets relative to the electrodes and said squeeze rolls.

10. A method of welding a pair of metal sheets along adjacent edges thereof, that consists in forming a right-angled flange along the edge of each sheet, the flanges extending in opposite direction, placing said sheets alongside one another so that the outside corners of the flanges are in abutment, applying opposed squeezing pressure to the inside corners of said flanges progressively from one end of said flanges to the other, then at the location of the application of said squeeze pressures passing welding current from one sheet to the other through the point of contact of the outside corners of the flanges whereby weld metal is progressively formed in portions of said flanges and progressively squeezed into the gap between the outside corners thereof, thereby to form a solid continuous weld.

11. The method of edge-welding sheet metal objects that consists in forming on adjacent edges of the objects to be welded, oppositely extending flanges, so guiding the flanges of said objects that the outside corners of said flanges abut at substantially a point contact, applying opposed pressure forces to said objects at locations adjacent the inside corners of the flanges, passing electric current through the abutting corners of the objects in quantity sufficient to fuse the metal at said point of contact, and so moving the objects relative to the point of application of said forces that the point of fusion moves progressively along the corners of said flanges.

12. A method as in claim 11 in which the objects are metal sheets.

13. Apparatus for edge-welding sheet metal objects having oppositely extending flanges at adjacent edges, comprising means for so guiding the flanges that the outside corners thereof are in abutment at a preselected area of contact, said guide means including electrode means for applying pressure to said objects at such a location adjacent said flanges that electric current will flow from one object to the other through the abutting flange corners to effect fusion thereof, and means for applying opposed pressure to said objects at such a location adjacent said flanges that the fused corners are squeezed to form a weld, said guide means being movable relative to said objects whereby fusion and welding thereof progresses along the adjacent corners of said flanges.

14. Apparatus as in claim 13 in which the guide means comprises a pair of opposed roll assemblies disposed to have the objects pass between them, each assembly comprising a roller electrode, a disc spaced from the roller electrode and being of substantially the same diameter and being secured to the electrode and insulation for insulating the disc from the electrode, the spaces between said rollers receiving the respective flanges of said objects, and support means for each assembly, one of which is provided with means for moving its roll assembly to or from pressure and welding position, the electrodes being so located relative to one another that welding current flows from one of said electrodes through said objects at the abutting corners to the other electrode.

15. Apparatus as in claim 14 in which means are provided for so relatively adjusting said roll assemblies that the gap and set-down of the flanges as they approach the space between the roll assemblies, may be predetermined and controlled.

References Cited in the file of this patent

UNITED STATES PATENTS

| | | |
|---|---|---|
| 1,977,715 | Coleman | Oct. 23, 1934 |
| 2,009,884 | Free | July 30, 1935 |
| 2,147,868 | Von Henke | Feb. 21, 1939 |
| 2,452,498 | Schwartz | Oct. 26, 1948 |
| 2,784,299 | Matthes | Mar. 5, 1957 |

FOREIGN PATENTS

| | | |
|---|---|---|
| 712,905 | Germany | Oct. 28, 1941 |